United States Patent
Lee et al.

(10) Patent No.: US 12,401,189 B2
(45) Date of Patent: Aug. 26, 2025

(54) ESD POWER CLAMP DEVICES AND CIRCUITS

(71) Applicant: Taiwan Semiconductor Manufacturing Company, Ltd., Hsinchu (TW)

(72) Inventors: Jam-Wem Lee, Hsinchu (TW); Wun-Jie Lin, Hsinchu (TW); Chia-Jung Chang, Hsinchu (TW); Li-Wei Chu, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 70 days.

(21) Appl. No.: 18/359,052

(22) Filed: Jul. 26, 2023

(65) Prior Publication Data
US 2025/0038524 A1    Jan. 30, 2025

(51) Int. Cl.
*H02H 9/04* (2006.01)

(52) U.S. Cl.
CPC ................... *H02H 9/045* (2013.01)

(58) Field of Classification Search
CPC ..................................... H02H 9/045
USPC ......................................... 361/56
See application file for complete search history.

(56) References Cited

U.S. PATENT DOCUMENTS

| | | | |
|---|---|---|---|
| 2006/0092590 A1* | 5/2006 | Chuang ................ | H10D 89/819 361/91.1 |
| 2008/0002320 A1* | 1/2008 | Gossner .............. | H01L 27/0266 361/56 |
| 2010/0232078 A1* | 9/2010 | Bhattacharya ...... | H01L 27/0266 361/56 |
| 2011/0149449 A1* | 6/2011 | Lin ..................... | H01L 27/0262 361/56 |
| 2013/0229736 A1* | 9/2013 | Van Der Borght .... | H02H 9/044 361/56 |
| 2019/0319453 A1* | 10/2019 | Sithanandam ...... | H01L 27/0255 |

* cited by examiner

*Primary Examiner* — Kevin J Comber
(74) *Attorney, Agent, or Firm* — Jones Day (57) ABSTRACT

Devices, circuits, and methods for electrostatic discharge (ESD) protection are provided. An electrostatic discharge (ESD) protection circuit comprises a first transistor connected between a first voltage and a second voltage, and a first control circuit connected between the first voltage and the second voltage, and configured to supply a control signal to the first transistor. The circuit further comprises a second transistor connected between the second voltage and a third voltage, and a second control circuit connected between the second voltage and the third voltage, and configured to supply a control signal to the second transistor. The first control circuit and the second control circuit are connected to each other via a first interconnect and a second interconnect. The first and second transistors are configured to turn on in response to an ESD event.

20 Claims, 11 Drawing Sheets

ESD POWER CLAMP DEVICES AND CIRCUITS

BACKGROUND

Electrostatic discharge (ESD) events cause a sudden flow of electricity between two points at different potentials. ESD events are problematic for semiconductor devices because the discharge may generate a large current that can damage internal components. To protect against ESD events, semiconductor devices may incorporate ESD protection circuits.

BRIEF DESCRIPTION OF THE DRAWINGS

The following detailed description will be better understood when read in conjunction with the appended drawings. For the purpose of illustration, there is shown in the drawings certain embodiments of the present disclosure. It should be understood, however, that the invention is not limited to the precise arrangements and instrumentalities shown. The accompanying drawings, which are incorporated in and constitute a part of this specification, illustrate an implementation of systems and apparatuses consistent with the present invention and, together with the description, serve to explain advantages and principles consistent with the invention.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

It is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity and are not intended to limit the scope of the invention or the appended claims. Further, it should be understood that any one of the features can be used separately or in combination with other features. Other systems, methods, features, and advantages of the invention will be or become apparent to one with skill in the art upon examination of the detailed description. It is intended that all such additional systems, methods, features, and advantages be included within this description, be within the scope of the present invention, and be protected by the accompanying claims.

As noted above, ESD events may cause damage to semiconductor devices and integrated circuits. For example, in a complimentary metal-oxide-semiconductor integrated circuit (CMOS IC), an ESD event may generate a current surge that breaks down a gate dielectric layer of transistors within the circuit. To protect against ESD events, circuits and devices described herein may include an ESD clamp circuit located between voltage supplies having different potentials.

For multi-power circuits and devices, multiple power clamps may be used to provide ESD protection between each voltage supply and ground. For components that are attached across power domains (e.g. an internal circuit connected to a first voltage at one end and a second voltage at another), an additional cross power clamp may be used to more fully protect against ESD zapping between powers. For example, connecting internal circuits between a first voltage VDD1 and a second voltage VDD2 may require three power claims: a first clamp between VDD1 and VSS, a second clamp between VDD2 and VSS, and a third clamp between VDD1 and VDD2. Each additional clamp in a design may take up valuable layout area on a semiconductor chip and may increase power consumption.

Certain circuits and devices described herein may combine multiple power clamps into a smaller number (e.g. a single) of ESD clamps. For example, by combining multiple (e.g., two) power clamps into one clamp, layout area may be reduced by as much as 50% or more with a corresponding reduction in power consumption.

Figure 1:
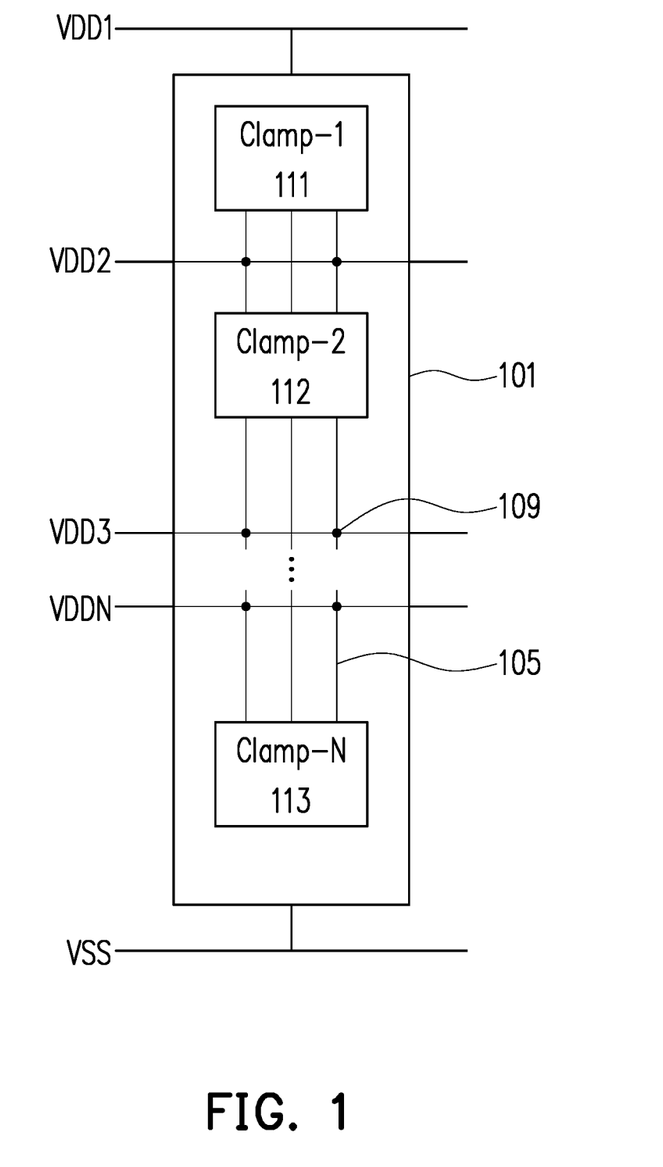
FIG. 1 is a block diagram depicting an ESD clamp according to an embodiment.

FIG. 1 is a block diagram depicting an ESD clamp 101 according to an embodiment. ESD clamp 101 may be provided as an intermediate component between one or more voltage sources and downstream circuit components that utilize those voltage sources. ESD clamp 101 may be connected between a first voltage supply VDD1 and a ground voltage supply VSS, and may further be connected to a plurality of intermediate voltage supplies therebetween. In an embodiment, ESD clamp 101 may be connected to N number of voltage supplies VDD1, VDD2, VDD3, . . . VDDN. Each voltage supply may carry a different voltage level, and supply that voltage level to connected components and devices. The ESD clamp may be configured to provide a path to conduct current between voltage levels in the event of an ESD event.

ESD clamp 101 may comprise a plurality of interconnected sub-clamps 111, 112, 113. Each sub-clamp may be connected between adjacent voltage supplies. For example, clamp-1 111 may be connected between VDD1 and VDD2, clamp-2 112 may be connected between VDD2 and VDD3, and so on until clamp-N 113 which may be connected between VDDN and VSS. Adjacent sub-clamps may be connected to one another by conductive routing 105. The connection scheme, described in greater detail below, allows multiple sub-clamps to be integrated into one clamp, thereby decreasing the layout area used and power consumed by ESD protection.

Each sub-clamp may be connected to adjacent sub-clamps along multiple paths. In an embodiment, some of these paths may comprise nodes 109 wherein the path between adjacent sub-clamps also connect with a voltage supply. For example, as shown in FIG. 1, interconnections between clamp-1 111 and clamp-2 112 may comprise nodes 109 that intersect with VDD2. The specifics of these interconnections and the components making up the clamps are described in greater detail in the circuit diagrams that follow.

Figure 2:
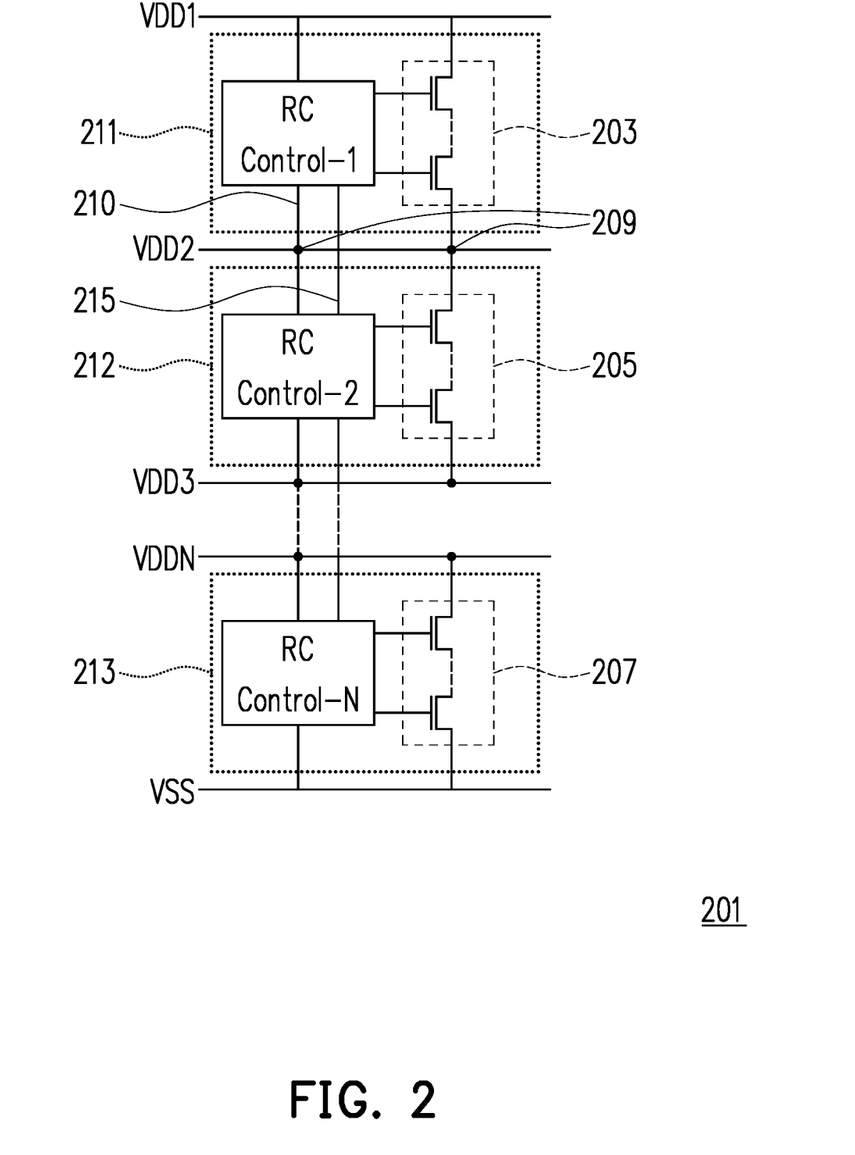
FIG. 2 is a circuit diagram depicting an ESD clamp circuit according to an embodiment.

FIG. 2 is a circuit diagram depicting an ESD clamp 201 according to an embodiment. ESD clamp 201 may include similar components to those described above with respect to FIG. 1. ESD claim 201 may comprise a plurality of sub-clamps connected between a first voltage supply VDD1 and a ground voltage supply VSS. Each sub-clamp may comprise a control circuit and a transistor module. For example, a first sub-clamp 211 may comprise a first control circuit RC Control-1, and a first transistor module 203. A second sub-clamp 212 may comprise a second control circuit RC Control-2, and a second transistor module 205. Additional sub-clamps may be provided in a similar manner until a final Nth sub-clamp 213 is provided between a final Nth voltage supply VDDN and the ground voltage VSS. Final control circuit 213 may comprise an Nth control circuit RC Control-N and an Nth transistor module 207.

Each transistor module may comprise a bigFET, meaning a field-effect transistor having a large channel width. Adjacent bigFETs of the ESD clamp may be connected to one another. The bigFETs may be p-type metal-oxide-semiconductor (PMOS) transistors or n-type metal-oxide-semiconductor (NMOS) transistors that are configured to conduct current during an ESD event, thereby providing a path between voltage supplies that protects the internal circuit from being subjected to this surge. In some embodiments, bigFETs may be normally off, such that the transistor is in an off state and not conducting when there is no ESD event occurring. An ESD event may cause the transistor to turn on and allow the current surge from the event to pass through.

The RC control circuits RC Control-1. RC-Control-2, and RC Control-N may comprises resistors and capacitors. In each control circuit, the resistance and capacitance values may be chosen so as to tune the switching characteristics of an associated bigFET. For optimal operation of the device, the bigFET will be set such that it is normally off and does not switch on in response to standard operations, but is responsive to any ESD events. Adjacent RC control circuits may also be connected to one another through conductive routing.

In an embodiment, adjacent RC control circuits may be connected by more than one interconnect. For example, RC Control-1 and RC Control-2 may two interconnects therebetween. A first connection line 210 between adjacent control circuits may form a node 209 wherein the routing connecting adjacent RC control circuits also connects to a voltage supply. An additional connection 215 may not intersect with a voltage supply line. Providing the additional connection 215 may allow ESD clamps described herein to operate all bigFET devices within the clamp at high gate-source voltages (Vgs), thereby allowing more current to pass through the clamp during an ESD event. Although depicted as one line in FIG. 2, additional connection 215 may comprise multiple interconnects connecting adjacent sub-clamps to one another without intersecting a voltage supply line.

Figure 3:
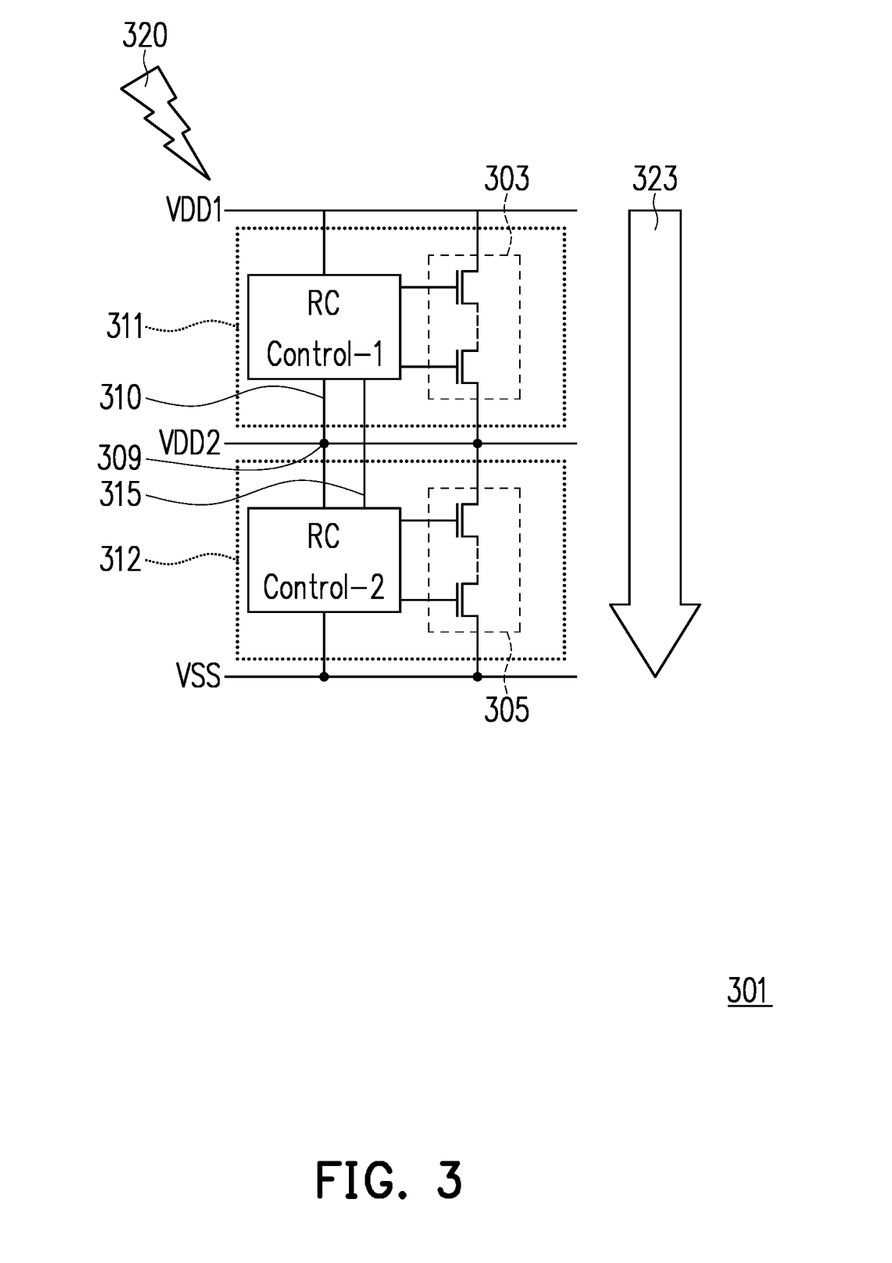
FIG. 3 is a circuit diagram depicting an ESD event occurring in an ESD clamp according to an embodiment.

FIG. 3 is a circuit diagram depicting an ESD event occurring in an ESD clamp 301 according to an embodiment. ESD clamp 301 may comprise a first sub-clamp 311 comprising a first bigFET 303 connected to a first control circuit RC Control-1. First bigFET 303 and RC Control-1 may be connected between a first voltage supply VDD1 and a second voltage supply VDD2. ESD clamp 301 may further comprise a second sub-clamp 312 comprising a second bigFET 305 connected to a second control circuit RC Control-2. Second bigFET 305 and RC Control-2 may be connected between second voltage supply VDD2 and ground voltage VSS.

First sub-clamp 311 and second sub-clamp 312 may be interconnected via multiple routing lines. For example, there may be two connections between RC Control-1 and RC Control-2, and a there may a third connection between first bigFET 303 and second bigFET 305. A first interconnect 310 between 311 and 312 may intersect with VDD2 at node 309. Additional interconnect 315 may not intersect with a voltage supply. By connecting the first sub-clamp 311 and second sub-clamp 312 in with additional interconnect 315, both sub-clamps may be operated at high voltage.

For example, first bigFET 303 may be a normally off transistor having a threshold voltage (Vth) that results in the transistor switching. An ESD event 320 may cause RC-Control-1 to supply a high voltage signal to the bigFET 303 thereby applying a gate-source voltage greater than Vth to the bigFET 303. This may switch the transistor on, causing the bigFET conduct the current surge from the ESD event through the ESD clamp 301. In an embodiment the applied gate-source voltage may comprise a high voltage value H.

Without the connection scheme described herein, the second bigFET 305 may have a lower gate source voltage than the first bigFET 303. For example, in such a scheme, the gate-source voltage of 305 may be H/2. This lower voltage limits the current that can be shunted by the clamp module. By incorporating additional connection 315, the high voltage signal may be passed from RC Control-1 to RC Control-2 such that bigFET 305 may also operate with a gate-source voltage of H. This may allow for substantially all of the current generated in the ESD event to be transferred through the clamp 301, as indicated by arrow 323. This may represent up to a 300% increase in current flow as compared to those schemes not implementing the extra connection.

Figure 4:
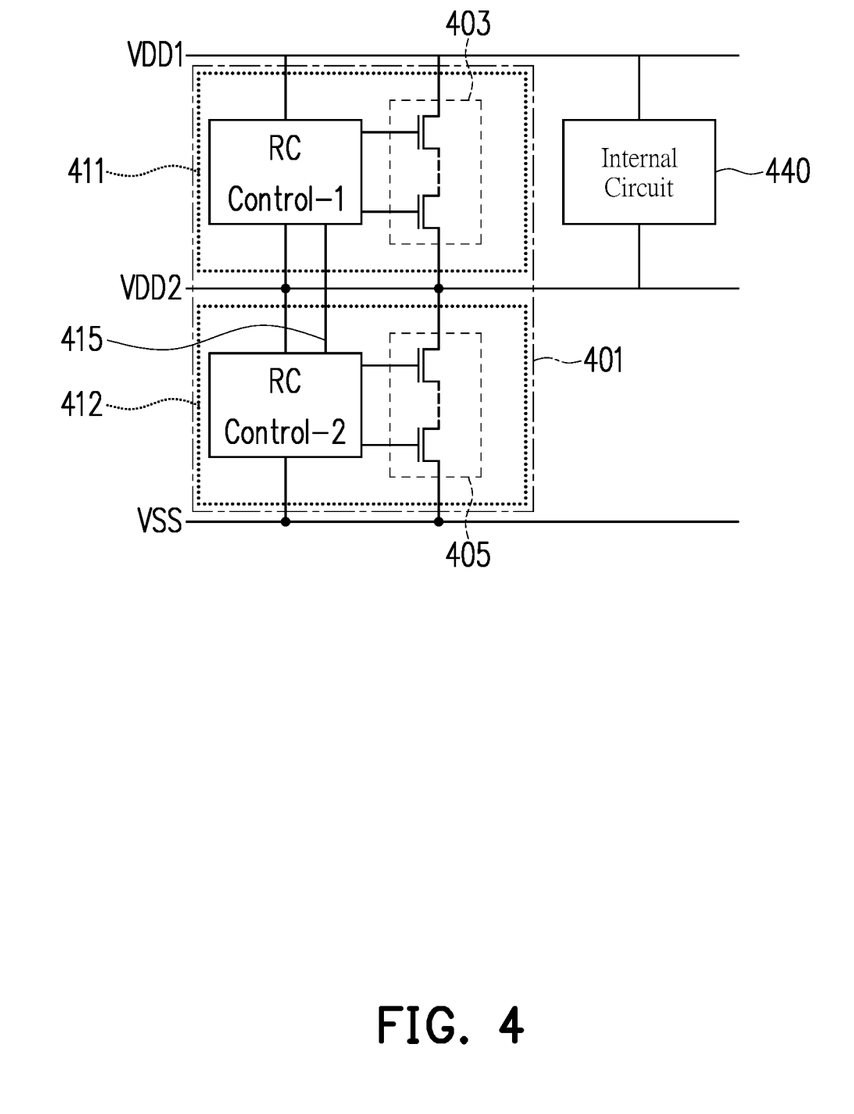
FIG. 4 is a circuit diagram depicting a semiconductor device incorporating an ESD clamp according to an embodiment.

FIG. 4 is a circuit diagram depicting a semiconductor device incorporating an ESD clamp 401 according to an embodiment. ESD clamp 401 may include the same or similar components as the clamp described above with respect to FIG. 3. ESD clamp 401 may comprise a first sub-clamp 411 and a second sub-clamp 412. The first sub-clamp 411 may further comprise a first bigFET 403 and a first control circuit RC Control-1. The second sub-clamp 412 may comprise a second bigFET 405 and a second control circuit RC Control-2. First sub-clamp 411 and second sub-clamp 412 may be connected through multiple interconnects, including a connection 415 that does not intersect with VDD2. Interconnect 415 may provide direct connection between RC Control-1 and RC Control-2. In an embodiment, the interconnect 415 may connect an output of one of RC Control-1 or RC Control-2 to the other control circuit. Such a connection scheme is described in greater detail below with respect to FIG. 5. Providing interconnect 415 may allow second bigFET 405 to operate at the same gate-source voltage as first bigFET 403 during an ESD event.

The semiconductor device may further comprise an internal circuit 440. In an embodiment, the internal circuit 440 is provided in parallel with the first sub-clamp 411 between VDD1 and VDD2. During an ESD event, ESD clamp 401 may provide a path for current to discharge without surging through, and potentially damaging, the internal circuit 440. In other embodiments, the internal circuit 440 may be provided in different configurations. For example, the internal circuit may be connected between VDD1 and VSS, between VDD2 and VSS, or connected to all three. Additionally, the semiconductor device may comprise more than one internal circuit. For example, the device may comprise a first internal circuit in parallel with first sub-clamp 411 and a second internal circuit in parallel with second sub-clamp 412. The ESD clamp 401 allows flexibility and provides ESD protection across multiple powers and multiple configurations of the internal circuit.

Figure 5:
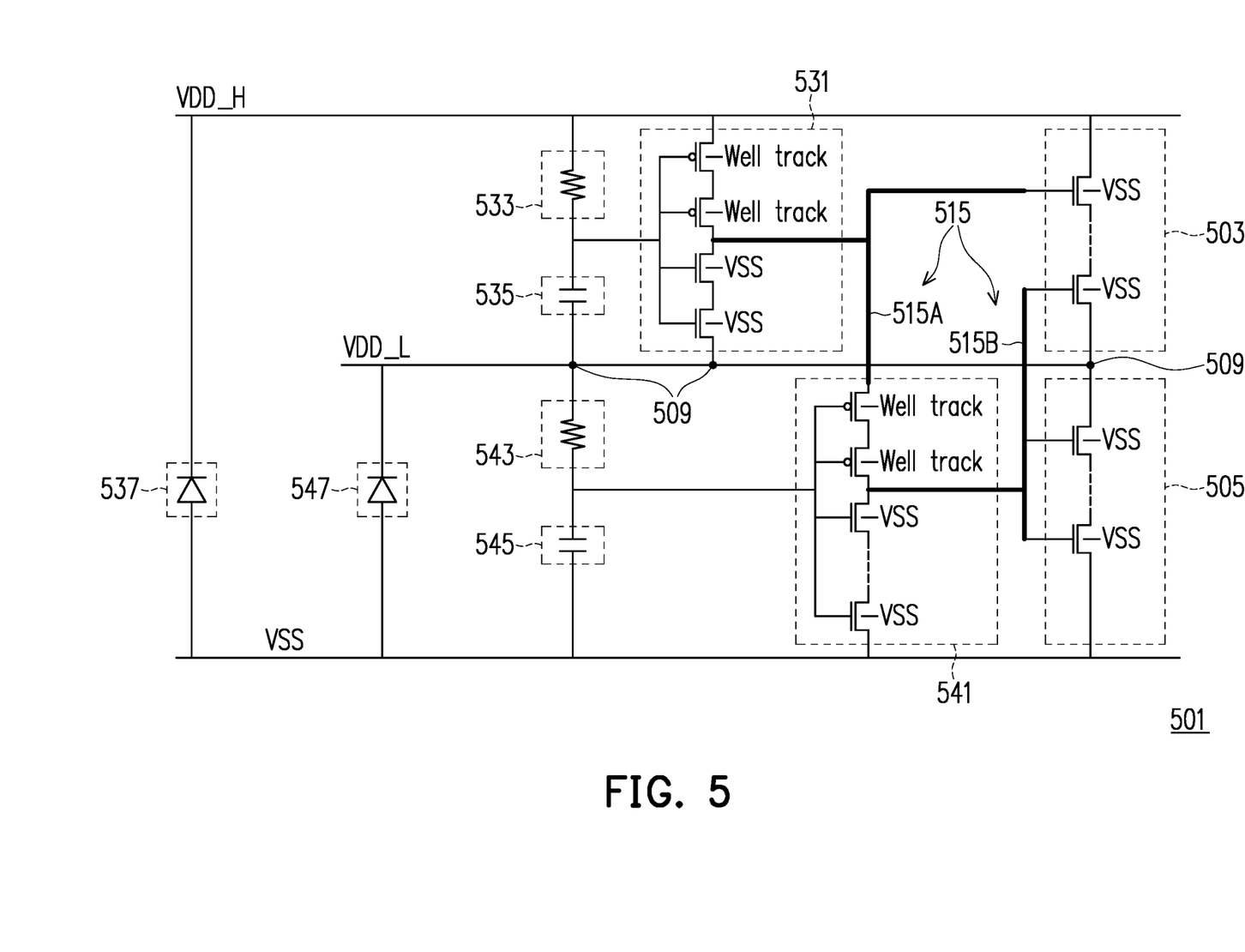
FIG. 5 is a circuit diagram depicting an ESD clamp circuit according to an embodiment.

FIG. 5 is a circuit diagram depicting an ESD clamp 501 according to an embodiment. ESD clamp 501 may be provided across multiple powers, having first components in a first sub-clamp located between a high voltage supply VDD_H and a low voltage supply VDD_L, and second components in a second sub-clamp located between low voltage supply VDD_L and a ground voltage VSS. Each sub-clamp may comprise a normally off bigFET configured to turn on in response to an ESD event. In the embodiment depicted in FIG. 5, each bigFET comprises an NMOS bigFET. First NMOS bigFET 503 and second NMOS bigFET 505 may have back gates connected to the ground voltage to assist in controlling characteristics and behavior of the transistors.

The first sub-clamp may further comprise an RC control circuit comprising a resistor 533, a capacitor 535, and a control unit 531. The characteristics of the resistor 533 and capacitor 535 may be selected based on the threshold voltage of bigFET 503 so as to tune the sensitivity of the device. In an embodiment, the resistor 533 and capacitor 535 may form an RC component that provides an ESD detection function for ESD events occurring between VDD_H and VDD_L.

For example, the control unit 531 may have an input connected at a point between the resistor 533 and capacitor 535. Under normal operation with no ESD event, the RC component may supply a high voltage for the control unit input. The control unit 531 may be configured to invert this signal and pass along the inverted signal to the first bigFET 503. As such, the control unit passes a low voltage signal or an off signal to the first bigFET 503 in the absence of an ESD event. During an ESD event, the voltage supplied to the control unit 531 by the RC component may decrease and cause the output from the control unit 531 to bigFET 503 to increase. In this manner, the ESD event is detected by the resistor 533 and capacitor 535. When this signal crosses the threshold voltage of bigFET 503, the transistor turns on and begins to conduct current.

The first control unit 531 may comprise a plurality of transistors connected between VDD_H and VDD_L. The first control unit 531 is connected to the low voltage supply VDD_L at a first node 509. In an embodiment, the first control unit 531 may comprise two NMOS transistor and two PMOS transistors. A first PMOS transistor may have a source connected to VDD_H, a gate connected to RC component, and a drain connected to a source of the second PMOS transistor. The second PMOS may further comprise a gate connected to the RC component, and a drain connected to a drain of a first NMOS transistor and an output of the first control unit 531. The first NMOS transistor may further comprise a gate connected the RC component and a source connected to a drain of the second NMOS transistor. The second NMOS transistor may further comprise a gate connected to the RC component and a source connected to VDD_L.

In addition to the connections described above, each transistor of the first control unit 531 may comprise a back gate. The two NMOS transistors may have back gates connected to ground voltage VSS. The two PMOS transistors may have back gates connected to a well track circuit. The well track circuit may prevent current leakage in the device is described in further detail below with respect to FIG. 7.

The second sub-clamp may be connected between VDD_L and VSS, and may comprise similar components to those described above with respect to the first sub-clamp. For example, the second sub-clamp may comprise a second resistor 543, a second capacitor 545, a second control unit 541, and second bigFET 505. The second resistor 543 and second capacitor 545 may form an RC component that provides an ESD detection function for ESD events occurring between VDD_L and VSS. The second control unit 541 may be configured to receive signals from the RC component of the second sub-clamp and output an inverted signal to a gate of the second bigFET.

The second control unit 541 may have a similar structure to first control 531 and may comprise a plurality of transistors. The second control unit may comprise first and second PMOS transistors connected in series, but rather than comprising two NMOS transistors, the second control 541 may comprise a single NMOS bigFET having a drain connected to a drain of one of the PMOS transistors. Transistors of the second control unit may also comprise back gates. The PMOS transistors may have back gates connected to the well track circuit, while the NMOS bigFET may have a back gate connected to the ground voltage VSS.

The clamp may comprise multiple interconnects between the first sub-clamp and the second sub-clamp. In an embodiment, the capacitor 535 of the first sub-clamp may connect to VDD_L at a node 509. The second resistor 543 of the second sub-clamp may also connect to this node. The first bigFET 503 may be connected to the second bigFET 505 through another node 509 that intersects with VDD_L.

In the embodiment of FIG. 5 in which both bigFETs are NMOS transistors, a source of the first bigFET 503 may connect to a drain of the second bigFET 505. The ESD clamp 501 may further comprise additional connections 515 that connect the first sub-clamp to the second sub-clamp. These connections may assist in allowing the second bigFET 505 to operate at higher gate-source voltages.

The additional connections may comprise a first additional connection 515A that connects the output of the first control unit 531 and the gate of the first bigFET 503 to the second control unit 541. The additional connections may further comprise a second additional connection 515B that connects the first bigFET 503 to the gate of second bigFET 505 and the second control unit 541. By providing these interconnects, a gate-source voltage of the second bigFET 505 may be substantially equal to that of the first bigFET 503 during an ESD event.

ESD clamp 501 may also comprise a plurality of diodes connected between voltage supply lines. In an embodiment, the clamp may comprise a first diode 537 connected between VDD_H and VSS, and a second diode 547 connected between VDD_L and VSS. The diodes may prevent current from backflowing to VSS, thereby ensuring that an ESD event will discharge through the proper channels.

Figure 6:
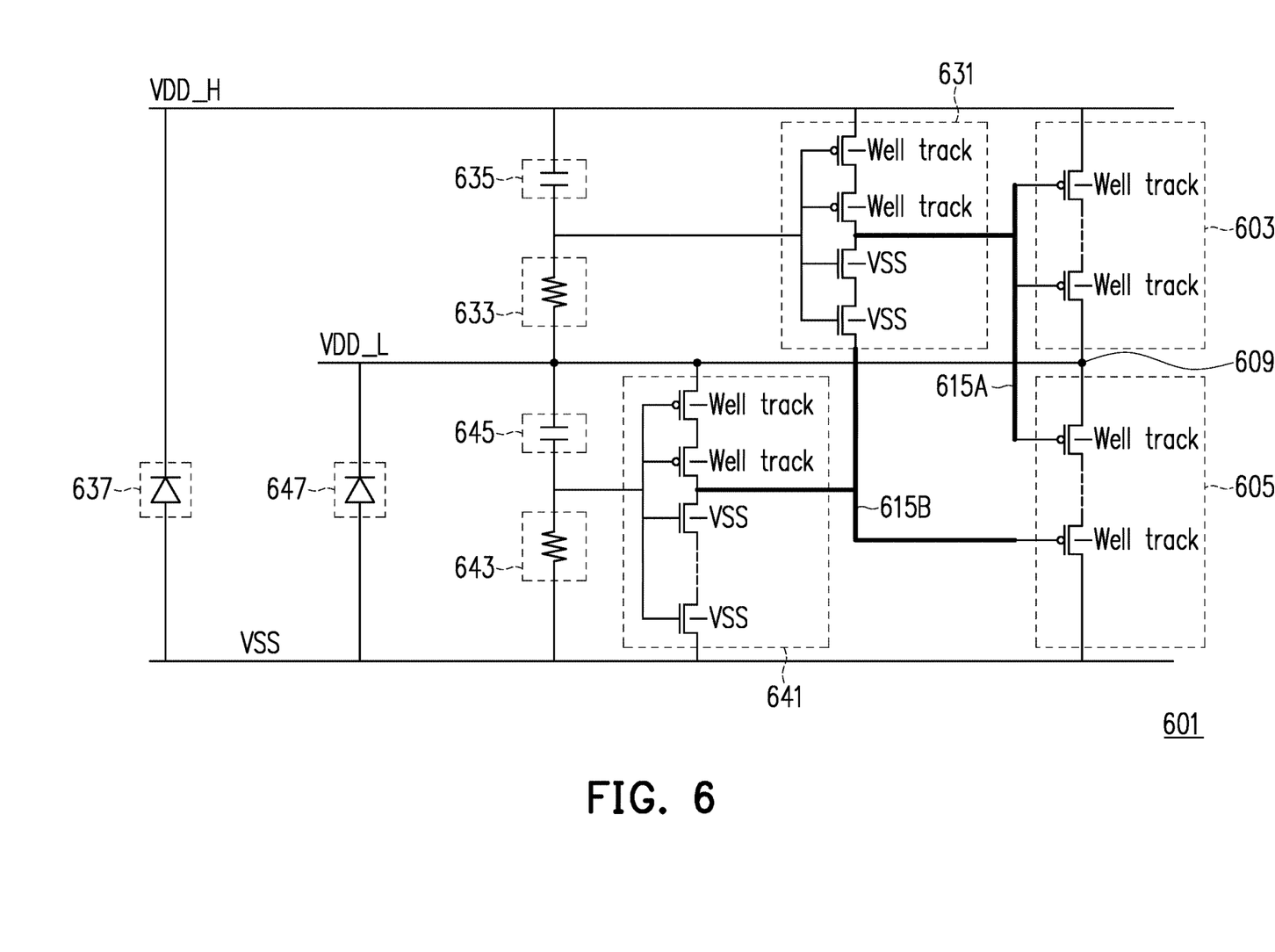
FIG. 6 is a circuit diagram depicting an ESD clamp circuit according to an embodiment.

FIG. 6 is a circuit diagram depicting an ESD clamp 601 according to an embodiment. The components of ESD clamp are similar to those described above with respect to FIG. 5, except that first bigFET 603 and second bigFET 605 may comprise PMOS transistors. The first bigFET 603 and the second bigFET 605 may comprise back gates connected to a well track circuit configured to prevent current leakage. The circuit operates in a similar fashion to that described above, but the manner in which the components are connected may differ to reflect the PMOS operation of the bigFETs.

ESD clamp 610 may comprise a first sub-clamp connected between high voltage VDD_H and low voltage VDD_L. The first sub-clamp may comprise a resistor 633, a capacitor 635, a first control unit 631, and the first bigFET 603. The resistor 633 and capacitor 635 may provide an ESD detection function, as described above with respect to FIG. 5.

The first control unit 631 may comprise an inverter comprised of a PMOS bigFET and an NMOS bigFET. The PMOS bigFET may comprise a back gate that is connected to a well track circuit, and the NMOS bigFET may comprise a back gate connected to ground voltage VSS. In the first sub-clamp of ESD clamp 601, the output of first control unit 631 may be connected to a gate of the first bigFET 603 and to a gate of the second bigFET 605 by an additional interconnect 615A. A source of the NMOS bigFET of the first control unit 631 may be connected to the output of second control unit 641 and the gate of second bigFET 605.

ESD clamp 601 may further comprise a second sub-clamp connected between low voltage VDD_L and ground VSS. The second sub-clamp may comprise a second resistor 643, a second capacitor 645, a second control unit 641, and the second bigFET 605. The second resistor 643 and second capacitor 645 may combine to form an RC component that provides an ESD detection function by supplying a voltage to the second control unit 641.

The second control unit 641 may comprise an inverter including an NMOS bigFET and a PMOS bigFET. The NMOS bigFET and PMOS bigFET may be configured to invert the input signal supplied by the resistor 643 and capacitor 645. The NMOS bigFET may have a source connected to VSS and a drain connected to a drain of the PMOS bigFET. The PMOS bigFET may further have a source connected to VDD_L. Both the transistors of the second control unit 641 may have gates connected to the input signal supplied by the RC component. The PMOS bigFET of the inverter may further comprise a back gate connected to the well track circuit. The NMOS bigFET of the inverter may further comprise a back gate connected to ground voltage VSS.

The output of second control unit 641 is connected to the gate of the second bigFET 605, as well as to a source of the NMOS bigFET of the first control unit 631. This connection is provided via a second additional connection 615B. Additional connections 615A/615B may allow for the second bigFET 605 to operate at a same gate-source voltage as the first bigFET 603, thereby increasing the amount of current that the clamp is capable of discharging. The well track circuit, described in more detail below, may further improve the efficiency of the ESD clamp.

Figure 7:
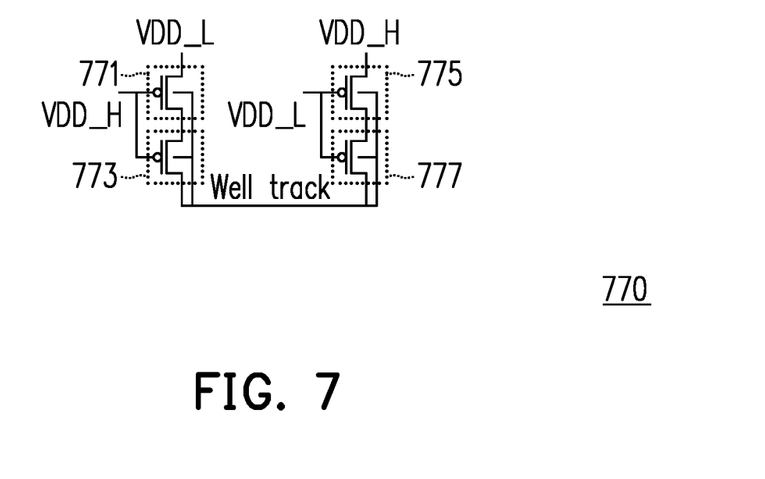
FIG. 7 is a circuit diagram depicting a well track circuit according to an embodiment.

FIG. 7 is a circuit diagram depicting a well track circuit 770 according to an embodiment. The well track circuit 770 may be provided with an ESD clamp in order to prevent current leakage during normal operation. In the absence of a well track circuit, there may be high leakage in an ESD clamp from VDD_L to VDD_H through the body of device components. Incorporating the well track circuit 770 may compensate for differences in potential in a device body and reduce leakage.

The well track circuitry 770 may comprise a plurality of transistors connected to a well track line. The well track line may further be connected to transistors of an ESD clamp as described above with respect to FIGS. 5 and 6. In an embodiment, the plurality of transistors may comprise PMOS transistors including a first transistor 771, a second transistor 773, a third transistor 775, and a fourth transistor 777. Each of the plurality of transistors may comprise a back gate connected to the well track line.

The first transistor 771 may further comprise a source connected to VDD_L, a gate connected to VDD_H and a drain connected to a source of second transistor 773. The second transistor 773 may further comprise a gate connected to VDD_H and a drain connected to the well track line. Third transistor 775 may further comprise a source connected to VDD_H, a gate connected to VDD_L, and a drain connected to a source of the fourth transistor 777. The fourth transistor 777 may further comprise a gate connected to VDD_L and a drain that is also connected to the well track line. Connecting the transistors in this manner may prevent leakage from VDD_L to VDD_H under normal operation.

Figure 8:
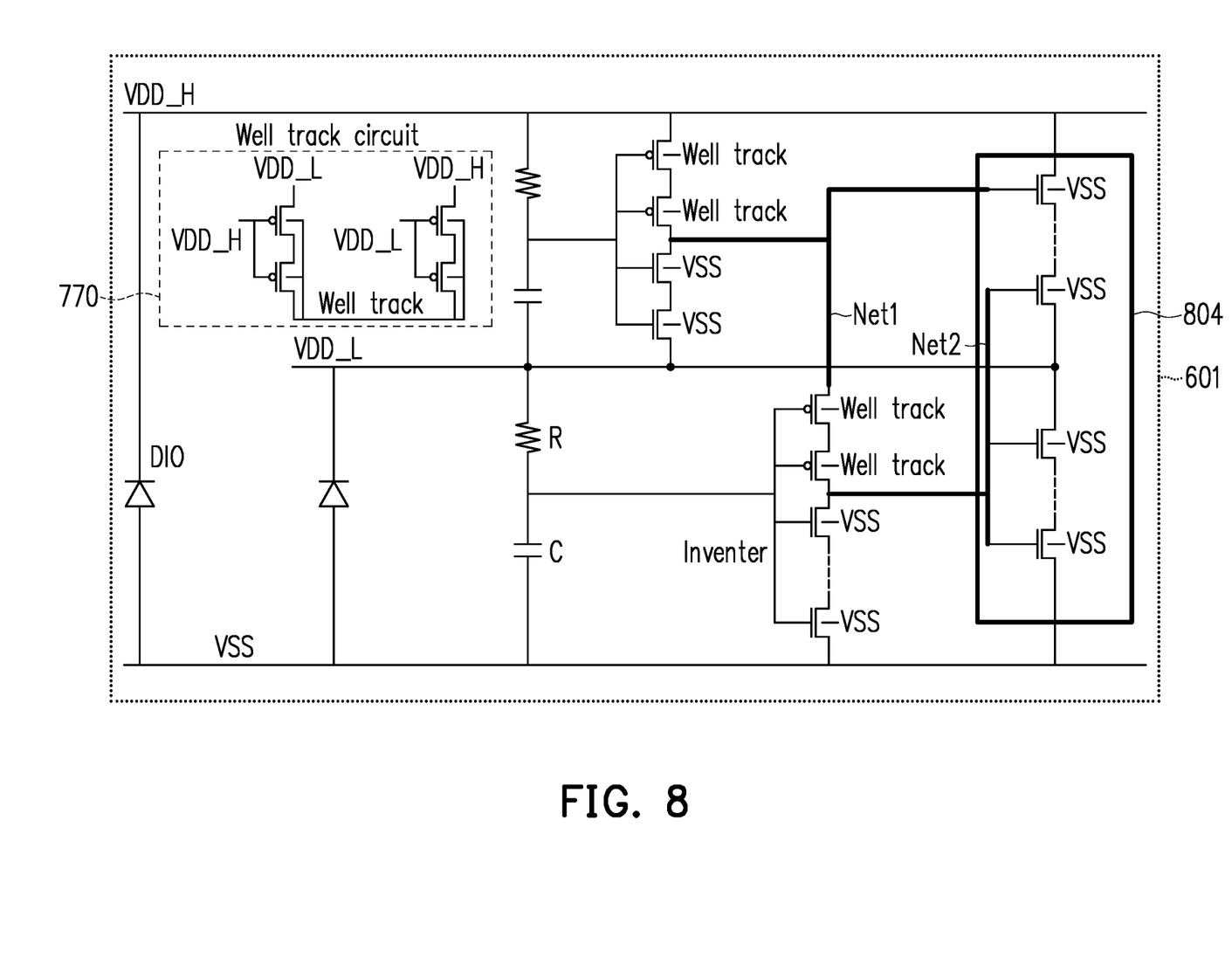
FIG. 8 is a circuit diagram depicting an ESD clamp device according to an embodiment.
Figure 9:
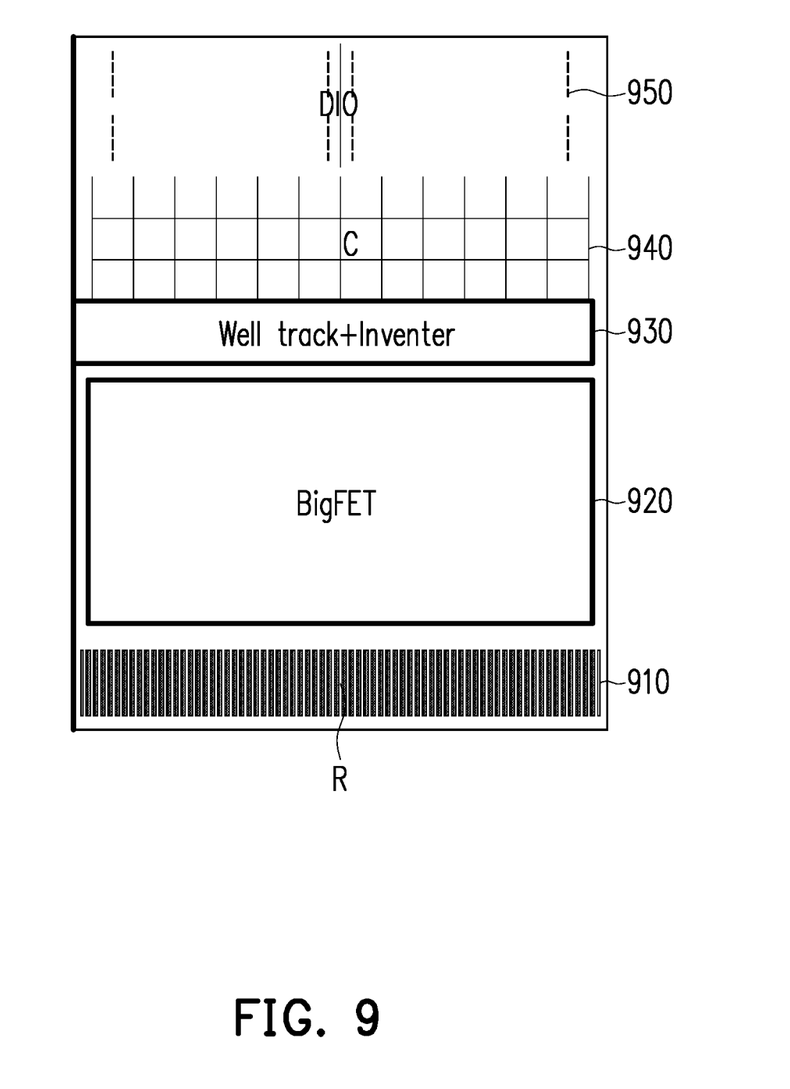
FIG. 9 is a schematic diagram depicting a layout of an ESD clamp device according to an embodiment.
Figure 10:
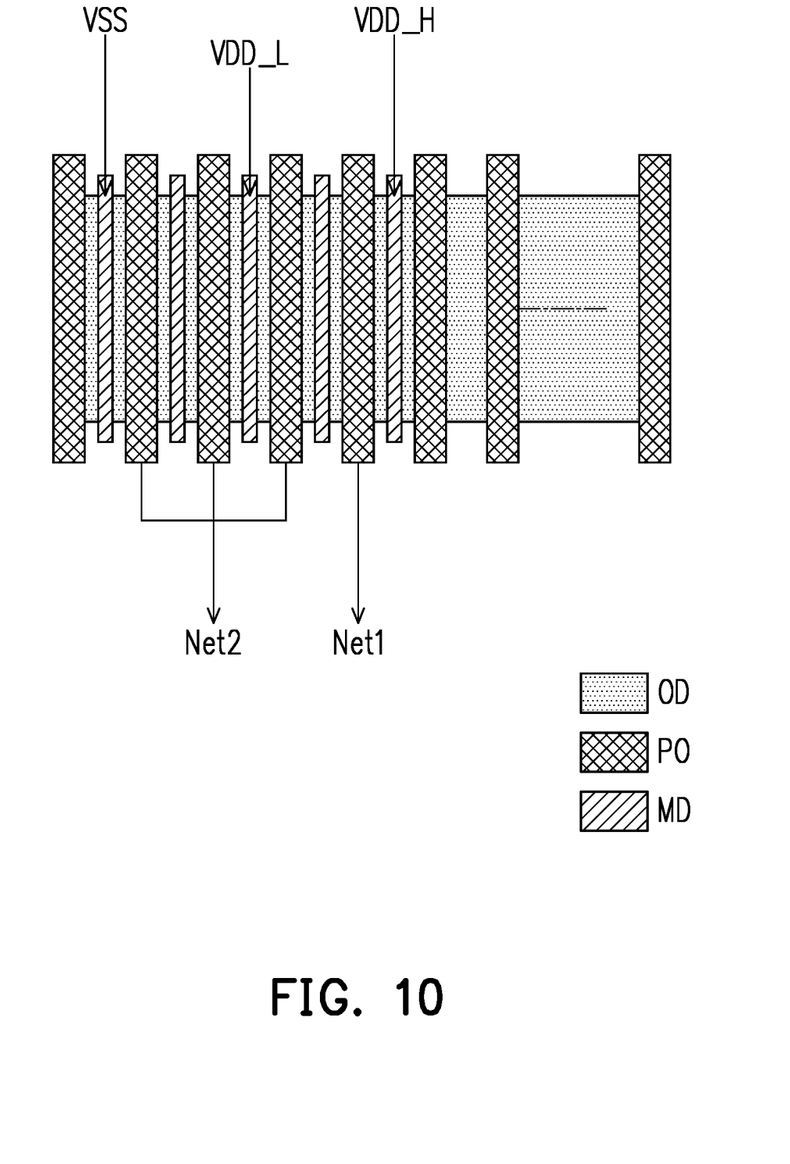
FIG. 10 is a schematic diagram depicting a plan view of an ESD clamp device according to an embodiment.

FIGS. 8-10 are a circuit diagram, a schematic diagram depicting a layout, and schematic diagram depicting a plan view of an ESD clamp device according to an embodiment. FIG. 8 depicts an ESD clamp comprising PMOS bigFETs 601, and incorporating a well track circuit 770. The ESD clamp may be substantially similar to that described above with respect to FIG. 6 and the well track circuit may be substantially similar to that described above with respect to FIG. 7.

For the purpose of clarity, only the second sub-clamp is labeled in FIG. 8, however, equivalent structures are present in the first sub-clamp as described above. Each sub-clamp comprises a resistor R, a capacitor C, and a control unit, labeled in FIG. 8 as Inverter. The first bigFET and second bigFET of ESD clamp 601 may be grouped together into a bigFET region 804. The ESD clamp device further comprises diodes DIO to restrict current backflow. The additional connections may define a plurality of nets representing interconnected structures within the clamp. For example the interconnection between the output of the first control circuit, a source of a transistor of the second control circuit, and the gate of the first bigFET may define a first net, Net-1. The interconnection between the output of the second control circuit, the gate of the second bigFET and the gate of the first bigFET may define a second net, Net-2.

FIG. 9 is a schematic diagram depicting a layout of an ESD clamp device according to an embodiment. The ESD clamp device may comprise a resistor region 910 along a first edge. Adjacent to the resistor region 910 may be a transistor region 920 comprising bigFET devices of the ESD clamp. Adjacent to the transistor region 920 may be a region 930 that comprises the well track circuit and the inverter control circuits of the ESD clamp. Adjacent to the region 930 may be a capacitor region 940. Adjacent to the capacitor region 940 may be a diode region 950. Providing the components of the clamp in this manner may allow for symmetrical arrangement of a plurality of sub-clamps.

FIG. 10 is a schematic diagram depicting a plan view of an ESD clamp device according to an embodiment. FIG. 10 depicts the layout of the bigFET region without additional back-end of line (BEOL) routing resistance. The ESD clamp device may be formed in a diffusion region OD. The ESD clamp device may comprise metal layers MD that supply a voltage to the ESD clamp device. For example, a first MD layer may supply a ground voltage VSS, a second MD layer may supply low voltage VDD_L, and a third MD layer may supply high voltage VDD_H. Additionally, the ESD clamp device may comprise polysilicon gates PO arranged at intervals above the diffusion region OD. The polysilicon gates may comprise gates of transistors of the ESD clamp that are routed together to form bigFETs that are interconnected into Net-1 and Net-2 as described above with respect to FIG. 8.

Figure 11:
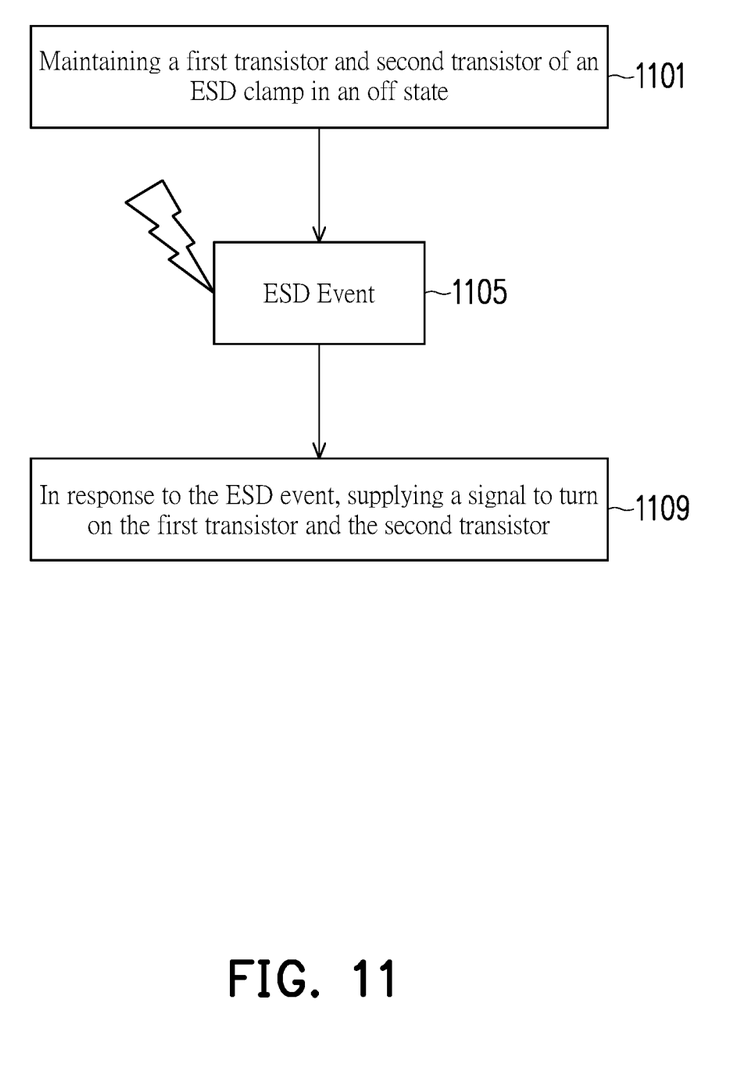
FIG. 11 is a flowchart depicting a method of protecting a device from an ESD event according to an embodiment.

FIG. 11 is a flowchart depicting a method of protecting a device from an ESD event according to an embodiment. FIG. 11 is described with reference to FIG. 3 above for purposes of clarity, however, the method is applicable to any of the clamp devices and circuits described herein. At 1101, an ESD clamp may be provided. The ESD clamp may be ESD clamp 301 comprising sub-clamps 311 and 312. In some embodiments, the ESD clamp may be provided such that internal circuitry of the device is placed in parallel with the first sub-clamp 311 as shown in FIG. 4. But, as described above, the ESD clamp may also be provided in other configurations that allow for the clamp to divert a current surge from internal circuitry and sensitive components of the device during an ESD event.

The method proceeds at 1103 wherein the ESD clamp may be operated such that a first transistor of the first sub-clamp and a second transistor of the second sub-clamp are in an off state. The first transistor may comprise normally off bigFET 303, as depicted in FIG. 3, and may be connected between a first voltage VDD1 and a second voltage VDD2. The second transistor may comprise normally off bigFET 305 connected between second voltage VDD2 and a third voltage VSS.

The transistors may be maintained in their off states by connected control circuits. The first transistor 303 may be maintained in its off state by RC Control-1 and the second transistor may be maintained in its off state by RC Control-2. Each control circuit may comprise a resistor and a capacitor that form an RC component capable of detecting an ESD event. The RC components may supply a signal to control units of the control circuits. The control circuits may comprise inverters that output an inverted signal to the transistors. When there are no ESD events present, the RC component may supply a high voltage signal to the control units, which invert this signal, thereby holding the transistors in their off state.

The method proceeds depending upon whether not an ESD event is detected at 1105. Under normal operating conditions where no ESD event occurs, the flow continues to 1109B. In such cases, the first transistor and the second transistor of the ESD clamp may be maintained in the off state as shown at 1109B.

In other circumstances, an ESD event may strike the clamp. For example, an event 320 may strike along the first voltage VDD1. This event may be detected by an RC component of RC Control-1, as discussed in greater detail above with respect to FIG. 5 and FIG. 6. The ESD event may cause a current surge that can damage components of a semiconductor device or integrated circuit connected to the ESD clamp. When an ESD event is detected, the method proceeds to 1109A, and, in response to the ESD event, a signal may be supplied to turn on the first transistor and the second transistor thereby allowing the transistor to conduct this current surge through the ESD clamp.

The turn on signal may be supplied by a control circuit of the ESD clamp. For example, when the ESD event 320 strikes VDD1, the voltage supplied to the control unit by RC component of RC Control-1 may drop. This, in turn, may cause the inverted signal supplied to the first transistor 303 to increase. When this signal crosses the threshold voltage the first transistor may turn on. As described above, the presence of additional interconnects 315 allows the signal to also be supplied to, and turn on, the second transistor. This signal thus switches on both transistors, allowing them to conduct current and protect any connected devices from the ESD surge.

Circuits, devices, and methods are described herein. An example electrostatic discharge circuit comprises a first transistor connected between a first voltage and a second voltage, and a first control circuit connected between the first voltage and the second voltage, and coupled to the first transistor. The circuit further comprises a second transistor connected between the second voltage and a third voltage, and a second control circuit connected between the second voltage and the third voltage, and coupled to the second transistor. A first interconnect is provided between the first control circuit and the second control circuit, wherein the first interconnect is connected to the second voltage, and an additional interconnect is provided between the first control circuit and the second control circuit.

In an example semiconductor device, an internal circuit and an ESD clamp are provided. The ESD clamp comprises a first sub-clamp comprising a first RC control circuit and a first transistor and a second sub-clamp connected to the first sub-clamp and comprising a second RC control circuit and a second transistor. The first transistor and the second transistor are configured to have substantially the same gate-source voltage during an ESD event.

In an example method for protecting a device from electrostatic discharge (ESD) an ESD clamp comprising a plurality of sub-clamps is provided. The plurality of sub-clamps includes a first sub-clamp connected between a first voltage supply and a second voltage supply carrying a different voltage level from the first voltage supply, and a second sub-clamp connected between the second voltage supply and a third voltage supply carrying a different voltage level from the first voltage supply and the second voltage supply. The ESD clamp is operated such that, in an absence of ESD events, a first transistor of the first sub-clamp is in an off state and a second transistor of the second sub-clamp is an off state. In response to an ESD event, a signal is supplied to turn on the first transistor and the second transistor.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the scope of the present disclosure.

What is claimed is:

1. An electrostatic discharge (ESD) protection circuit, comprising:

a first transistor and a third transistor connected in series between a first voltage and a second voltage, wherein the first voltage and second voltage comprise different voltage levels;

a first control circuit connected between the first voltage and the second voltage, and configured to supply a first signal to a gate of the first transistor;

a second transistor connected between the second voltage and a third voltage, wherein the third voltage comprises a different voltage level from the first voltage and the second voltage;

a second control circuit connected between the second voltage and the third voltage, and having an output terminal connected to gates of the second and third transistors;

a first interconnect between the first control circuit and the second control circuit, wherein the first interconnect is connected to the second voltage; and a second interconnect between the first control circuit and the second control circuit, wherein the first transistor, second and third transistors are configured to turn on in response to an ESD event.

2. The circuit of claim 1, wherein the second interconnect between the first control circuit and second control circuit is not connected to the second voltage.

3. The circuit of claim 1, wherein the third transistor is connected to the second transistor.

4. The circuit of claim 1, wherein the first transistor and the second transistor comprise big field-effect transistors (bigFETs).

5. The circuit of claim 1, wherein the first transistor and the second transistor comprise NMOS transistors.

6. The circuit of claim 5, wherein the first control circuit comprises a first plurality of transistors configured as a first inverter and the second control circuit comprises a second plurality of transistors configured as a second inverter;

the second interconnect connects an output of the first inverter to a source of a first transistor of the second plurality of transistors.

7. The circuit of claim 1, wherein the first transistor and the second transistor comprise PMOS transistors.

8. The circuit of claim 7, further comprising a well track circuit, wherein the first transistor and the second transistor each comprise a back gate that is connected to the well track circuit.

9. The circuit of claim 7, wherein the first control circuit comprises a first plurality of transistors configured as a first inverter and the second control circuit comprises a second plurality of transistors configured as a second inverter;

the second interconnect connects an output of the second inverter to a source of a first transistor of the first plurality of transistors.

10. The circuit of claim 1, wherein the first control circuit and the second control circuit each comprise a resistor and a capacitor configured to detect an ESD event.

11. The circuit of claim 1, further comprising a first diode connected between the first voltage and the third voltage; and a second diode connected between the second voltage and the third voltage.

12. A semiconductor device, comprising:
an internal circuit; and
an ESD clamp configured to protect the internal circuit from ESD events, the ESD clamp comprising:

a first sub-clamp comprising a first RC control circuit, a first transistor, and a third transistor connected in series with the first transistor between a high voltage and a low voltage; and a second sub-clamp connected to the first sub-clamp and comprising a second RC control circuit and a second transistor connected between the low voltage and a ground voltage; and an interconnect that connects the first RC control circuit and the second RC control circuit, wherein the first RC control circuit and the second RC control circuit are configured to supply control signals to the first transistor, the second transistor, and the third transistor, the second RC control circuit has an output terminal connected to gates of the second and third transistors, and the interconnect is configured such that the first transistor and the second transistor have substantially the same gate-source voltage during an ESD event.

13. The semiconductor device of claim 12, wherein the RC first control circuit comprises at least one transistor having a back gate that is connected to a well track circuit, the well track circuit comprises a plurality of transistors each having a back gate connected to a well track line.

14. The semiconductor device of claim 12, wherein the internal circuit is connected between the high voltage and the low voltage.

15. The semiconductor device of claim 12, wherein the internal circuit is provided in parallel with the first sub-clamp.

16. The semiconductor device of claim 12, wherein the first transistor and the second transistor comprise bigFETs.

17. The semiconductor device of claim 12, wherein the first transistor and the second transistor are normally off.

18. A method for protecting a device from electrostatic discharge (ESD), comprising:

providing an ESD clamp comprising a plurality of sub-clamps including a first sub-clamp connected between a first voltage supply and a second voltage supply carrying a different voltage level from the first voltage supply, and a second sub-clamp connected between the second voltage supply and a third voltage supply carrying a different voltage level from the first voltage supply and the second voltage supply;

operating the ESD clamp such that, in an absence of ESD events, a first transistor and a third transistor of the first sub-clamp is in an off state and a second transistor of the second sub-clamp is an off state, wherein a source/drain terminal of the second sub-clamp is connected to gates of the second and third transistors; and supplying a signal to turn on the first transistor, the second transistor, and the third transistor in response to an ESD event.

19. The method of claim 18, wherein the first sub-clamp comprises a first control circuit connected to the first transistor, and the second sub-clamp comprises a second control circuit connected to the second transistor;

the first control circuit is connected to the second control circuit; and the first control circuit comprises a resistor and a capacitor making up an RC component that detects the ESD event.

20. The method of claim 19, wherein the first control circuit further comprises a control unit that supplies the signal to turn on the first transistor.

* * * * *